United States Patent
Beisele et al.

(10) Patent No.: US 11,525,054 B2
(45) Date of Patent: Dec. 13, 2022

(54) THERMOSETTING EPOXY RESIN COMPOSITION FOR THE PREPARATION OF ARTICLES FOR ELECTRICAL ENGINEERING, AND THE ARTICLES OBTAINED THEREFROM

(71) Applicant: Huntsman Advanced Materials Licensing (Switzerland) GMBH, Basel (CH)

(72) Inventors: Christian Beisele, Muellheim (DE); Sophie Colliard, Uffheim (FR); Hubert Wilbers, Schopfheim (DE)

(73) Assignee: Huntsman Advanced Materials Licensing (CH) GmbH, Basel (CH)

( * ) Notice: Subject to any disclaimer, the term of this patent is extended or adjusted under 35 U.S.C. 154(b) by 0 days.

(21) Appl. No.: 16/479,433

(22) PCT Filed: Jan. 25, 2018

(86) PCT No.: PCT/US2018/015188
§ 371 (c)(1),
(2) Date: Jul. 19, 2019

(87) PCT Pub. No.: WO2018/140576
PCT Pub. Date: Aug. 2, 2018

(65) Prior Publication Data
US 2019/0359816 A1    Nov. 28, 2019

(30) Foreign Application Priority Data
Jan. 26, 2017    (EP) .................................... 17153300

(51) Int. Cl.
| | | |
|---|---|---|
| *C08L 63/00* | (2006.01) | |
| *C08G 59/24* | (2006.01) | |
| *C08G 59/50* | (2006.01) | |
| *C08K 5/5435* | (2006.01) | |
| *H01F 27/32* | (2006.01) | |

(52) U.S. Cl.
CPC ............ *C08L 63/00* (2013.01); *C08G 59/245* (2013.01); *C08G 59/504* (2013.01); *C08K 5/5435* (2013.01); *H01F 27/327* (2013.01)

(58) Field of Classification Search
CPC .......... C08G 59/5006; C08L 63/00–10; C09D 163/00–10; C09J 163/00–10; C08J 2363/00–10; H01F 27/022; H01F 27/327; H01F 2027/328
See application file for complete search history.

(56) References Cited

U.S. PATENT DOCUMENTS

| | | | |
|---|---|---|---|
| 5,324,767 A | | 6/1994 | Koyama et al. |
| 5,350,826 A | * | 9/1994 | Watanabe ................. C08J 5/24 |
| | | | 525/423 |
| 6,001,902 A | | 12/1999 | Beisele |
| 6,223,421 B1 | * | 5/2001 | Lanoue ................... B29C 70/70 |
| | | | 264/272.13 |
| 6,399,199 B1 | * | 6/2002 | Fujino ....................... C08J 5/24 |
| | | | 428/293.4 |
| 7,550,550 B2 | | 6/2009 | Klein et al. |
| 2011/0143064 A1 | | 6/2011 | Da Silva et al. |
| 2011/0319564 A1 | | 12/2011 | Corley et al. |
| 2012/0164900 A1 | | 6/2012 | Reichwein et al. |
| 2012/0202918 A1 | | 8/2012 | Singh et al. |
| 2013/0012669 A1 | | 1/2013 | Lin et al. |
| 2013/0217806 A1 | * | 8/2013 | Gehringer .............. C08G 59/50 |
| | | | 523/428 |
| 2015/0314644 A1 | * | 11/2015 | Grassi ....................... B60C 1/00 |
| | | | 152/537 |

FOREIGN PATENT DOCUMENTS

| | | | | |
|---|---|---|---|---|
| JP | H08283540 A | | 10/1996 | |
| WO | WO-2015058032 A1 | * | 4/2015 | ........... C08G 59/504 |
| WO | 2016/150614 A1 | | 9/2016 | |
| WO | WO-2016184749 A1 | * | 11/2016 | ........... C08G 59/621 |

OTHER PUBLICATIONS

Huntsman, Jeffamine D-400 Polyoxypropylenediamine Technical Bulletin (1998).*
International Search Report and Written Opinion received in corresponding PCT Application PCT/US2018/015188 completed Mar. 6, 2018 and dated Apr. 13, 2018.

\* cited by examiner

*Primary Examiner* — Kregg T Brooks
(74) *Attorney, Agent, or Firm* — Huntsman Advanced Materials

(57) ABSTRACT

A multiple component anhydride-free, thermosetting epoxy resin composition comprising, (A) at least one epoxy resin, and (B) at least one curing agent selected from the group of (b1) a polyetheramine of the formula (1) (Formula (1)), wherein x is a number of from 2 to 8, and (b2) a polyetheramine with at least one terminal end group of the formula (2) (Formula (2)), and (C) at least one epoxy silane, is, in particular, suitable for the manufacture of instrument transformers and dry-type transformers by casting, potting and encapsulation processes, wherein said articles exhibit good mechanical, electrical and dielectrical properties.

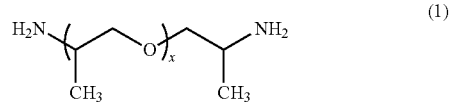

(1)

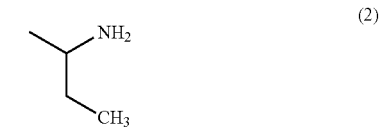

(2)

12 Claims, No Drawings

THERMOSETTING EPOXY RESIN COMPOSITION FOR THE PREPARATION OF ARTICLES FOR ELECTRICAL ENGINEERING, AND THE ARTICLES OBTAINED THEREFROM

CROSS-REFERENCE TO RELATED APPLICATIONS

This application is a National Stage application filed under 35 U.S.C. 371 of International Application No. PCT/US2018/015188 filed Jan. 25, 2018 which designated the U.S. and which claims benefit of European Patent Application with Ser. No. 17/153,300.3, filed Jan. 26, 2017, the entire contents of which is incorporated herein by reference.

STATEMENT REGARDING FEDERALLY SPONSORED RESEARCH OF DEVELOPMENT

Not applicable.

FIELD OF INVENTION

The present invention relates to an anhydride-free, thermosetting epoxy resin composition, a process for the preparation of articles for electrical engineering, such as insulation systems, wherein the epoxy resin composition is used, and the encapsulated articles obtained by the said process. The compositions are distinguished by selected polyetheramines and epoxysilanes. The insulation encased articles obtained exhibit good mechanical, electrical and dielectrical properties and can be used as, for example, insulators, bushings, switchgears, instrument transformers and dry-type transformers.

BACKGROUND

Epoxy resin compositions are commonly used for the preparation of insulation systems for electrical engineering. However, most of these epoxy resin compositions utilize anhydrides as curing agents. Due to the developing regulatory framework for chemicals, it is expected that the use of anhydrides in epoxy resins will be restricted in the near future, because of their R42 label (respiratory sensitizer). Therefore, some anhydrides are already on the SVHC candidate list (substances of very high concern) of the REACH regulation. It is likely that in some years these substances may no longer be used without special authorisation. As methyl hexahydrophthalic anhydride (MHHPA) and hexahydrophthalic anhydride (HHPA) are widely used as the main curing agents for epoxy resins for electrical insulation applications, there is a future need for alternative solutions that are not regarded as SVHC. As all known anhydrides are R42-labeled and even yet unknown anhydrides would be expected by toxicologists to be also R42-labeled, a solution that is free of anhydrides is desirable.

Curable epoxy resin compositions containing a polyetheramine for the preparation of encased electrical articles by casting applications are suggested in U.S. Pat. Nos. 6,001,902 and 8,399,577. The systems of the prior art use anhydrides as an additional curing agent.

Accordingly, there is a need for new thermosetting, anhydride-free epoxy resin compositions which advantageously can be used in potting or encapsulation applications for manufacturing of electrical insulation systems, such as switchgear or transformer applications.

DETAILED DESCRIPTION

It is an object of the present invention to provide an anhydride-free thermosetting epoxy resin composition which is suitable for the preparation of insulation systems for electrical engineering by casting, potting, or an encapsulation processes. The epoxy resin composition shall be R42-free and SVHC-free, and distinguished by a high fracture toughness and a good thermal cycle crack resistance. The epoxy resin composition shall be suitable, in particular, for the processing by automatic pressure gelation (APG) and vacuum casting, especially vacuum casting. Still another object of the present invention is to provide the encased articles obtained from casting, potting or encapsulation process which exhibit good mechanical, electrical and dielectrical properties, and can be used as, for example, insulators, bushings, switchgears, instrument transformers and dry-type transformers.

Surprisingly, it has been found that the use of an epoxy resin composition which is distinguished by selected polyetheramines as the hardener component and epoxysilanes meet the above objectives.

Accordingly, the present invention relates to anhydride-free, thermosetting epoxy resin compositions comprising
(A) at least one epoxy resin, and
(B) at least one curing agent selected from the group of
(b1) a polyetheramine of the formula

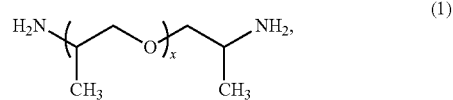

(1)

wherein
x is a number of from 2 to 8, and
(b2) a polyetheramine with at least one terminal end group of the formula

(2)

and
(C) at least one epoxy silane.

The at least one epoxy resin (A) is a compound containing at least one glycidyl ether group, preferably more than one glycidyl ether groups, for example, two or three glycidyl ether groups. The epoxy resin may be saturated or unsaturated aliphatic, saturated or unsaturated cycloaliphatic, aromatic or heterocyclic and may be substituted. The epoxy resin may also be a monomeric or a polymeric compound. A survey of epoxy resins useful for the use in the present invention can be found, for example, in Lee, H. and Neville, Handbook of Epoxy Resins, McGraw-Hill Book Company, New York (1982).

The epoxy resin (A) may vary and include conventional and commercially available epoxy resins, which may be used alone or in combinations of two or more. In choosing epoxy resins for the compositions according to the present invention, consideration should not only be given to properties of the final product, but also to viscosity and other properties that may influence the processing of the resin composition.

The epoxy resin (A) has an epoxy equivalent weight of, for example, about 160 to about 400 g/eq, preferably of about 170 to about 250 g/eq. If the epoxy resin is halogenated, the equivalent weight may be somewhat higher.

If required the epoxy resin (A) contains an epoxy diluent. The epoxy diluent component is, for example, a glycidyl terminated compound. Especially preferred are compounds containing glycidyl or β-methylglycidyl groups directly attached to an atom of oxygen, nitrogen, or sulfur. Such resins include polyglycidyl and poly(β-methylglycidyl) esters obtainable by the reaction of a substance containing two or more carboxylic acid groups per molecule with epichlorohydrin, glycerol dichlorohydrin, or O-methylepichlorohydrin in the presence of alkali. The polyglycidyl esters may be derived from aliphatic carboxylic acids, e.g., oxalic acid, succinic acid, adipic acid, sebacic acid, or dimerised or trimerised linoleic acid, from cycloaliphatic carboxylic acids such as hexahydrophthalic, 4-methylhexahydrophthalic, tetrahydrophthalic, and 4-methyltetrahydrophthalic acid, or from aromatic carboxylic acids, such as phthalic acid, isophthalic acid, and terephthalic acid.

Particularly suitable epoxy resins (A) known to the skilled worker are based on reaction products of polyfunctional alcohols, phenols, cycloaliphatic carboxylic acids, aromatic amines, or aminophenols with epichlorohydrin.

Aliphatic alcohols which come into consideration for reaction with epichlorhydrin to form suitable polyglycidyl ethers are, for example, ethylene glycol and poly(oxyethylene)glycols such as diethylene glycol and triethylene glycol, propylene glycol and poly(oxypropylene)-glycols, propane-1,3-diol, butane-1,4-diol, pentane-1,5-diol, hexane-1,6-diol, hexane-2,4,6-triol, glycerol, 1,1,1-trimethylolpropane, and pentaerythritol.

Cycloaliphatic alcohols which come into consideration for reaction with epichlorhydrin to form suitable polyglycidyl ethers are, for example, 1,4-cyclohexanediol (quinitol), 1,1-bis(hydroxymethyl)cyclohex-3-ene, bis(4-hydroxycyclohexyl)methane, and 2,2-bis(4-hydroxycyclohexyl)propane.

Alcohols containing aromatic nuclei which come into consideration for reaction with epichlorhydrin to form suitable polyglycidyl ethers are, for example, N,N-bis-(2-hydroxyethyl)aniline and 4,4'-bis(2-hydroxyethylamino)diphenylmethane.

Preferably, the polyglycidyl ethers are derived from substances containing two or more phenolic hydroxy groups per molecule, for example, resorcinol, catechol, hydroquinone, bis(4-hydroxyphenyl)methane (bisphenol F), 1,1,2,2-tetrakis(4-hydroxyphenyl)ethane, 4,4'-dihydroxydiphenyl, bis(4-hydroxyphenyl)sulphone (bisphenol S), 1,1-bis(4-hydroxylphenyl)-1-phenyl ethane (bisphenol AP), 1,1-bis(4-hydroxylphenyl)ethylene (bisphenol AD), phenol-formaldehyde or cresol-formaldehyde novolac resins, 2,2-bis(4-hydroxyphenyl)propane (bisphenol A), and 2,2-bis(3,5-dibromo-4-hydroxyphenyl)propane, especially 2,2-bis(4-hydroxyphenyl)propane (bisphenol A).

In a particular embodiment, the at least one epoxy resin (A) is a diglycidylether of bisphenol A having an epoxy equivalent weight of about 170 to about 250 g/eq, preferably of about 180 to about 190 g/eq.

Another few non-limiting embodiments include, for example, triglycidyl ethers of para-aminophenols. It is also possible to use a mixture of two or more epoxy resins.

The at least one epoxy resin component (A) is either commercially available or can be prepared according to processes known per se. Commercially available products are, for example, D.E.R. 330, D.E.R. 331, D.E.R.332, D.E.R. 334, D.E.R. 354, D.E.R. 580, D.E.N. 431, D.E.N. 438, D.E.R. 736, or D.E.R. 732 available from The Dow Chemical Company, or ARALDITE® MY 740 or ARALDITE® CY 228 from Huntsman Corporation.

The amount of epoxy resin (A) in the final composition can vary in wide ranges and is dependent on the use of the composition. In a certain embodiment, the amount of epoxy resin (A) is, for example, of from 50 weight percent (wt %) to 95 wt %, preferably of from 60 to 90 wt %, based on the total weight of components (A) and (B) in the composition. In a particular embodiment the amount of epoxy resin (A) is of from 70 to 80 wt %, based on the total weight of components (A) and (B) in the composition.

The curing agent (B) may be applied alone. Alternatively, the curing agent (B) may be used in combination with one or more other suitable curing agents known in the art for the curing of epoxy resins, which are not an anhydride curing agent, for example, primary or secondary amines, polyetheramines, acids, lewis acids, lewis bases and phenols. The identity of many of these curing agents and their curing mechanisms are discussed in Lee and Neville, Handbook of Epoxy Resins, McGraw-Hill (1982). Preferably, the curing agent (B) is applied alone. Mixtures of at least two, for example, two, three or four different polyetheramines selected from the group of (b1) and (b2) may be used, such as one polyetheramine (b1) and one polyetheramine (b2). In a particular embodiment, either the polyetheramine (b1) or the polyetheramine (b2) is applied as the curing agent (B), and no additional curing agent is applied in the compositions of this disclosure. Preferably, the polyetheramine (b2) is applied as the curing agent (B), and no additional curing agent is used.

The polyetheramines (b1) and (b2) of the curing agent (B) are known. Suitable polyetheramines (b2) can be prepared, for example, by amination of butylene oxide capped alcohols as described in U.S. Pat. No. 7,550,550. Examples of such polyetheramines include JEFFAMINE® polyetheramines that are commercially available from Huntsman Corporation. JEFFAMINE® polyetheramines typically have oxypropylene units or mixtures of oxyethylene and oxypropylene units. JEFFAMINE® polyetheramines which are preferred as curing agent components (1)1) and (b2) are JEFFAMINE® D-, and JEFFAMINE® XTJ-series polyetheramines, respectively.

The JEFFAMINE® D-series polyetheramines are amine terminated polypropylene glycols (PPG) of the general formula

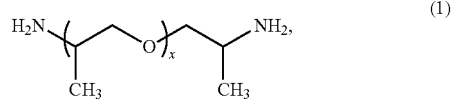

(1)

wherein x is a number of from 2 to 8, preferably a number of from 2 to 6, more preferably a number of from 2 to 5, especially about 2.5. In one embodiment JEFFAMINE® D-230 is used as the polyetheramine (b1).

The JEFFAMINE® XTJ-series polyetheramines are amines analogous to JEFFAMINE® D-230 polyetheramines available as JEFFAMINE® XTJ-568 and JEFFAMINE® XTJ-566, respectively, which provide for slower cure. JEF- JEFFAMINE® XTJ polyetheramines are primary amines, which may be prepared by amination of butylene oxide capped alcohols. The reaction results in primary amines with the terminal end group of the formula

(2)

In one embodiment JEFFAMINE® XTJ-568 is used as the polyetheramine (b2).

The amount of curing agent (B) in the final composition can vary in wide ranges and is, appropriately, determined by the desired properties of the curable composition and of the cured product. 0.75 to 1.25 equivalents of active hydrogen bound to amino nitrogen atoms of the curing agent (B) are, for example, used per 1 epoxy equivalent of the epoxy resin (A). In a certain embodiment, the total amount of the curing agent (B) including any other curing agents is, for example, of from 5 weight percent (wt %) to 50 wt %, preferably of from 10 to 40 wt %, based on the total weight of components (A) and (B) in the composition. In a particular embodiment, the total amount the curing agent (B) including any other curing agents is of from 20 to 30 wt %, based on the total weight of components (A) and (B) in the composition.

The at least one epoxy silane (C) is, for example, [3-(2, 3-epoxypropoxy)propyl]trimethoxy silane.

The amount of the epoxy silane (C) in the final composition is, for example, of from 0.1 weight percent (wt %) to 2 wt %, preferably of from 0.5 to 1.5 wt %, based on the total weight of components (A) and (C) in the composition. In a particular embodiment the amount of epoxy silane (C) is of from 0.8 to 1.2 wt %, based on the total weight of components (A) and (C) in the composition.

The optional at least one filler (D) is appropriately added in many applications of the present invention. The filler (D) may be coated, that is to say surface treated, or uncoated. Uncoated and coated fillers are commercially available or can be prepared according to processes known per se, for example, by silanization. In a certain embodiment the filler (D) is uncoated. Suitable fillers are, for example, metal powder, wood flour, glass powder, glass beads, semi-metal oxides, metal oxides, metal hydroxides, semi-metal and metal nitrides, semi-metal and metal carbides, metal carbonates, metal sulfates, and natural or synthetic minerals.

In a particular embodiment, the suitable filler (D) is selected from the group quartz sand, quartz powder, silica, aluminium oxide, titanium oxide, zirconium oxide, Mg(OH)$_2$, Al(OH)$_3$, dolomite [CaMg (CO$_3$)$_2$], Al(OH)$_3$, AlO(OH), silicon nitride, boron nitrides, aluminium nitride, silicon carbide, boron carbides, dolomite, chalk, calcium carbonate, barite, gypsum, hydromagnesite, zeolites, talcum, mica, kaolin and wollastonite. Preferred is quarz, silica, wollastonite or calcium carbonate, especially quarz or silica. Suitable silica is, for example, crystalline or amorphous silica, especially fused silica.

Appropriately, the amount of the at least one filler (D) in the final composition is, for example, of from 30 weight percent (wt %) to 75 wt %, preferably of from 50 to 70 wt %, especially of from 55 to 65 wt %, based on the total weight of the thermosetting epoxy resin composition.

Further additives may be selected from processing aids to improve the rheological properties of the resin composition, hydrophobic compounds including silicones, wetting/dispersing agents, plasticizers, dyes, pigments, reactive or non-reactive diluents, flexibilizers, accelerators, antioxidants, light stabilizers, pigments, flame retardants, fibers, fungicides, thixotropic agents, toughness improvers, antifoams, antistatics, lubricants, anti-settling agents, wetting agents and mould-release agents and other additives generally used in electrical applications. These additives are known to the person skilled in the art.

Preferred are thermosetting epoxy resin compositions comprising:
(A) at least one diglycidylether of bisphenol A having an epoxy equivalent weight of about 170 to about 250,
(B) at least one curing agent selected from the group of
    (b1) a polyetheramine of the formula (1), wherein x is a number of from 2 to 6, and
    (b2) a polyetheramine with at least one terminal end group of the formula (2), and
(C) [3-(2,3-epoxypropoxy)propyl]trimethoxy silane.

In a particular embodiment, the thermosetting epoxy resin compositions comprise
(A) 70 to 80 wt % of at least one diglycidylether of bisphenol A with an an epoxy equivalent weight of about 170 to about 250, based on the total weight of components (A) and (B) in the composition,
(B) 20 to 30 wt % of at least one curing agent selected from the group of
    (b1) a polyetheramine of the formula (1), wherein x is a number of from 2 to 6, and
    (b2) a polyetheramine with at least one terminal end group of the formula (2), based on the total weight of components (A) and (B) in the composition, and
(C) 0.5 to 1.5 wt % of [3-(2,3-epoxypropoxy)propyl] trimethoxy silane, based on the total weight of components (A) and (C) in the composition.

The compositions of the present disclosure are useful for the preparation of articles for electrical engineering, such as insulation systems.

Accordingly, the present invention is also directed to a process for the preparation of an article for electrical engineering, wherein an anhydride-free, thermosetting resin composition is used, said resin composition comprising
(A) at least one epoxy resin, and
(B) at least one curing agent selected from the group of
    (b1) a polyetheramine of the formula

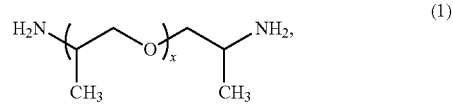

(1)

wherein
x is a number of from 2 to 8, and
(b2) a polyetheramine with at least one terminal end group of the formula

(2)

and (C) at least one epoxy silane, wherein the definitions, embodiments and preferences given above apply.

Articles for electrical engineering, such as insulation systems, are usually prepared by casting, potting, or encapsulation processes, such as gravity casting, vacuum casting, automatic pressure gelation (APG), vacuum pressure gelation (VPG), and the like. Such processes typically include a curing step in the mold for a time sufficient to shape the epoxy resin composition into its final infusible three dimensional structures, typically up to ten hours, and a post-curing step of the demolded article at elevated temperature in a separate curing oven to develop the desired physical and mechanical properties of the cured epoxy resin compositions.

Preferably, the epoxy resin compositions of the present disclosure are processed by APG or vacuum casting to yield the articles for electrical engineering. In a particular embodiment the epoxy resin compositions of the present invention are processed by vacuum casting.

Exemplary uses of the insulation systems produced according to the present invention are instrument transformers or dry-type transformers, for example, cast coils for dry type distribution transformers, or vacuum cast dry distribution transformers, which within the resin structure contain electrical conductors.

The following Examples serve to illustrate the invention. Unless otherwise indicated, the temperatures are given in degrees Celsius, parts are parts by weight and percentages relate to % by weight. Parts by weight relate to parts by volume in a ratio of kilograms to litres.

DESCRIPTION OF INGREDIENTS

ARALDITE® MY 740: bisphenol-A diglycidylether epoxy resin with an epoxy equivalent of 180-190 g/eq (Huntsman)

DY 045: polyethylenegylcole with 400 g/mol

DETDA: diethyl toluene diamine (Lonza)

ARALDITE® CY 228: modified bisphenol A diglycidylether epoxy resin with an epoxy equivalent of 188-200 g/eq (Huntsman)

ARADUR® HY 918-1: Anhydride hardener consisting of various isomers of methyltetrahydrophtalic anhydride (Huntsman)

Accelerator DY 062: N,N-dimethyl-benzylamine (Huntsman)

Silica W12: silica flour flower with an average particle size of 16 micron (Quarzwerke)

TEP-2E4MHZ: inclusion catalyst comprising 1,1,2,2-tetrakis(4-hydroxyphenyl) ethane as host molecule and 2-ethyl-4-methylimidazole as guest molecule (Nippon Soda)

LME 11132: formulated epoxy resin (Huntsman)

JEFFAMINE® XTJ-568: polyetheramine with at least one terminal end group of the formula (2) (Huntsman)

LME 11089: hardener containing monoethylene glycol-polybutyleneoxidediamine and isophorone diamine (Huntsman)

ARADUR® 42: Isophoron-diamine (Huntsman)

JEFFAMINE® D-230: polyoxypropylene diamine (Huntsman)

Silane A-187: [3-(2,3-epoxypropoxy)propyl]trimethoxy silane (Momentive)

Example 1

A thermosetting resin composition is prepared by using as the epoxy resin component (A) 99 parts of ARALDITE® MY 740 epoxy resin, as the curing agent component (B) 30 parts of JEFFAMINE® XTJ-568 polyetheramine, and as the epoxy silane (C) 1 part of Silane A-187, and mixing the components (A), (B) and (C) by means of a blade agitator at room temperature for 5 minutes. A total of 195 parts of Silica W12 are added as the filler (D) in portions (60 wt % based on the total weight of the thermosetting epoxy resin composition). The mixture is degassed under vacuum and poured into a mold preheated to 80° C. The mold temperature is increased to 120° C. and kept at this temperature for 2 h to prepare plates for mechanical testing. After cooling and demolding the plates are machined into test specimens.

Example 2

Example 1 is repeated, except that 31.5 parts of JEFFAMINE® D-230 polyetheramine are used as the curing agent component (B) instead of 30 parts of JEFFAMINE® XTJ-568 polyetheramine, and 198 parts of Silica W12 are used as the filler instead of 195 parts (60 wt % based on the total weight of the thermosetting epoxy resin composition). Components (A), (B), (C) and (D) are processed to provide test specimens as given in Example 1.

Comparative Example 1

For comparison, a thermosetting resin composition is prepared by mixing 100 parts of ARALDITE® CY 228 epoxy resin, 20 parts of DY 045, 85 parts of ARADUR® HY 918-1 hardener, and 0.8 parts of Accelerator DY 062 by means of a blade agitator at room temperature for 5 minutes. A total of 385 parts of Silica W12 are added in portions (65 wt % based on the total weight of the thermosetting epoxy resin composition) while heating the composition within 10 minutes to about 60° C. The mixture is degassed under vacuum and poured into a mold preheated to 80° C. The mold temperature is increased to 145° C. and kept at this temperature for 10 h to prepare plates for mechanical testing. After cooling and demolding the plates are machined into test specimens.

Comparative Example 2

For comparison, a thermosetting resin composition is prepared by pre-mixing 100 parts of ARALDITE® MY 740 epoxy resin, and 28 parts of a mixture containing 8 parts of ARADUR® 42 hardener and 20 parts of JEFFAMINE® XTJ-568 polyetheramine, and adding a total of 192 parts of Silica W12 as the filler (60 wt % based on the total weight of the thermosetting epoxy resin composition). The composition is fed into a batch mixer at a temperature of 40° C. and injected into the mold preheated to 110 to 120° C. and mold temperature is kept at this temperature for 2 h at a maximum temperature of 120° C.

Comparative Example 3

For comparison, a thermosetting resin composition is prepared by dispersing 3.0 parts of TEP-2E4MHZ in 100 parts of ARALDITE® MY 740 epoxy resin at room temperature within 5 minutes by means of a disperser stirrer. 20 parts of DETDA are added at room temperature to the dispersion obtained within 2 minutes under stirring with a blade agitator. Upon addition of 184.5 g of Silica W12 to the composition, mixing is continued for 5 minutes. The mixture is degassed under vacuum and poured into a mold preheated to 80° C. The mold temperature is increased to 140° C. and kept at this temperature for 5 h to prepare plates for mechanical testing. After cooling and demolding the plates are machined into test specimens.

The gel times of the reactive mixtures obtained in accordance with the Examples and Comparative Examples above are determined with a gel norm/gel timer at 80° C. and 140° C. according to the ISO 9396. For this purpose, the uncured compositions are slightly heated to facilitate filling of the gel norm tube. Exotherms are determined by Differential Scanning calorimetry on a Mettler SC 822$^e$.

Test data are summarized in Table 1 below.

Comparative Example 4

For comparison the test data obtained with an anhydride-free thermosetting resin composition as described during the "Symposium on Epoxy and Polyurethane Resins in Electrical and Electronic Engineering", Ostfildern, Germany, Apr. 19-21, 2016, are also given in Table 1. The composition is based on 100 parts of LME 11132, 28 parts of LME 11089 and 192 parts of Silica W12 (60 wt % based on the total weight of the thermosetting epoxy resin composition).

TABLE 1

Test data

| | | Example | | | | | |
|---|---|---|---|---|---|---|---|
| | Targets | Comp Ex 1 | Comp Ex 2 | Comp Ex 3 | Comp Ex 4 | Ex 1 | Ex 2 |
| Gel time at 80° C.[1] [min] | >30 | 150 | 24.1 | 162 | 25 | 41 | 30.9 |
| Gel time at 140° C.[1] [min] | <5 | 6.0 | 3.0 | 6.7 | 2.0 | 3.7 | 3.0 |
| Curing | $T_{max}$ = 120° C. | 10 h at 145° C. | 2 h at 120° C. | 5 h at 140° C. | 2 h at 120° C. | 2 h at 120° C. | 2 h at 120° C. |
| $Tg^{2)}$ [° C.] $1^{st}/2^{nd}$ run | 75-95 | 73/76 | 109/115 | >100 | 111/117 | 87/95 | 84/88 |
| Reaction Enthalpy[2] [J/g] | low | 81 | 126 | 105 | 196 | 180 | 184 |
| Tensile Strength[3] [MPa] | >75 | 77.5 | 61.0 | 81.0 | 86.0 | 80.0 | 80.0 |
| Elongation at Break[3] [%] | >2 | 1.12 | 0.9 | 1.02 | 1.66 | 2.30 | 2.30 |
| E-Modulus [MPa] | | 111317 | 8000 | | 8217 | 8319 | 8560 |
| $K_{1C}^{4)}$ [MPa √m] | >3.4 | 2.94 | 2.40 | 2.13 | 2.70 | 3.54 | 3.60 |
| $G_{1C}^{5)}$ [J/m$^2$] | >650 | 659 | 573 | 403 | 761 | 1311 | 1318 |
| CTE[6] [10$^{-6}$/K] | | 38.0 | 41.0 | 40.0 | 41.8 | 45.1 | 39.9 |
| Simulated Crack Temp[7] [° C.] | <-80 | -57 | -9 | -10 | -48 | -93 | -123 |
| Ea[8] | >45 | 65.0 | 42.1 | 64.7 | 51.0 | 48.6 | 47.1 |

[1] ISO 9396; Gel norm method

[2] Tg = glass transition temperature; IE 1006; Differential Scanning Calorimetry on a Mettler SC 822$^e$ (range: 20 to 250° C. at 10° C. min$^{-1}$)

[3] ISO 527

[4] Critical stress intensity factor mode I; double torsion test (Huntsman proprietary test method)

[5] Fracture Energy; double torsion test (Huntsman proprietary test method)

[6] Coefficient of Thermal Expansion; ISO 11359-2

[7] Simulated Crack Temperature is described in columns 9 and 10 of US-A-6638567, and calculated according to the formula RI = −498.08 · $z^{0.18480890}$ · $G^{0.194114601}$ · $(A-18)^{-0.391334273}$ · $T^{-0.158387791}$ + 224.25 wherein RI means Simulated Crack Temperature in ° C.

Z means Elongation at Break in %

G means $G_{1C}$ in J/m$^2$;

A means CTE in 10$^{-6}$/K

T means Tg in ° C.

[8] Ea = (ln((gel time at 80° C.)/min) − ln((gel time at 140° C.)/min))/(1/(80° C. + 273° C.) * K/° C.−1/(140° C. + 273° C.) * K/° C.) * 8.31 J/(mol * K)/1000 J/kJ The compositions of the present invention (Examples 1 and 2) meet the targeted gel times and glass transition temperature as the anhydride-based system of the prior art (Comparative Example 1). The anhydride-free systems of the prior art (Comparative Examples 2 and 4) are too reactive and do not meet the targeted gel time at 80° C.

In contrast to the compositions of the present invention, most of the prior art systems have insufficient mechanical performance (low elongation at break, low critical stress intensity factor, high simulated crack temperature). Therefore, the compositions of the present invention can advantageously be used, in particular, as casting systems for anhydride-free instrument transformers and dry type transformers.

What is claimed is:

1. A multiple component anhydride-free, thermosetting epoxy resin composition comprising:
   (A) at least one epoxy resin,
   (B) at least one polyetheramine with at least one terminal end group of the formula

(2)

(C) at least one epoxy silane, and
   (D) 55 wt %-65 wt %, based on the total weight of the thermosetting epoxy resin composition, of a filler selected from selected from the group of quartz sand, quartz powder, silica, aluminium oxide, titanium oxide, zirconium oxide, $Mg(OH)_2$, $Al(OH)_3$, dolomite [$CaMg(CO_3)_2$], AlO(OH), silicon nitride, boron nitride, aluminium nitride, silicon carbide, boron carbide, chalk, calcium carbonate, barite, gypsum, hydromagnesite, zeolite, talcum, mica, kaolin and a mixture thereof,
   wherein the at least one polyetheramine and the at least one epoxy resin are present in an amount such that the ratio of active hydrogen equivalents of the at least one polyetheramine to the epoxy equivalents of the at least one epoxy resin are in a range of from 0.75:1 to 1.25:1, wherein no additional curing agent is applied in the composition.

2. The composition according to claim 1, wherein the at least one epoxy resin (A) has an epoxy equivalent weight of about 170 to about 250 g/eq.

3. The composition according to claim 1, wherein the at least one epoxy resin (A) is a diglycidylether of bisphenol A.

4. The composition according to claim 1, wherein the at least one epoxy silane (C) is [3-(2,3-epoxypropoxy)propyl] trimethoxy silane.

5. The composition according to claim 1, wherein the filler is selected from the group consisting of quartz sand, quartz powder, silica, aluminium oxide, titanium oxide, and a mixture thereof.

6. The composition according to claim 1, wherein: the at least one epoxy resin (A) is at least one diglycidylether of bisphenol A having an epoxy equivalent weight of about 170 to about 250 g/eq, and the at least one epoxy silane (C) is [3-(2,3-epoxypropoxy) propyl]trimethoxy silane.

7. A process for the preparation of an article for electrical engineering comprising applying the thermosetting epoxy resin composition of claim 1 to the article and curing the thermosetting epoxy resin composition.

8. The process according to claim 7, wherein the article for electrical engineering is an instrument transformer or a dry-type transformer prepared by casting, potting, or an encapsulation process.

9. The process according to claim 8, wherein the article for electrical engineering is prepared by automatic pressure gelation (APG), or vacuum casting.

10. The process according to claim 9, wherein the article for electrical engineering is prepared by vacuum casting.

11. An article for electrical engineering obtained by the process according to claim 7.

12. The article of claim 11, wherein the article is an instrument transformer or a dry-type transformer.

* * * * *